United States Patent [19]
Chang

[11] Patent Number: 5,850,963
[45] Date of Patent: Dec. 22, 1998

[54] REUSABLE GIFT WRAPPING ASSEMBLY

[76] Inventor: Cherng Chang, P.O. Box 693, Miamisburg, Ohio 45343

[21] Appl. No.: 853,987

[22] Filed: May 9, 1997

Related U.S. Application Data

[63] Continuation of Ser. No. 366,628, Jan. 3, 1995, abandoned.

[51] Int. Cl.⁶ .................................................... B65D 25/34
[52] U.S. Cl. ...................................... 229/116.5; 229/87.19
[58] Field of Search ................................ 229/116.5, 162, 229/87.18, 87.19, 87.04; 206/457, 45.31, 45.33, 45.34

[56] References Cited

U.S. PATENT DOCUMENTS

| | | | |
|---|---|---|---|
| 843,419 | 2/1907 | Schultz | 229/162 X |
| 1,405,002 | 1/1922 | Rhodes | 229/162 X |
| 1,539,523 | 5/1925 | Spraggins | 229/162 X |
| 1,544,463 | 6/1925 | Lengsfield | 229/162 X |
| 1,568,982 | 1/1926 | Lengsfield | 229/162 X |
| 2,157,193 | 5/1939 | Webber et al. | 229/87.19 X |
| 2,157,194 | 5/1939 | Webber et al. | 229/87.19 X |
| 2,808,194 | 10/1957 | Dols | 229/87.19 X |
| 3,391,856 | 7/1968 | Siegler | 229/87.19 |
| 3,910,483 | 10/1975 | Ritter | 229/162 X |
| 4,353,461 | 10/1982 | Liang | 229/87.19 X |
| 4,930,903 | 6/1990 | Mahoney . | |
| 5,004,144 | 4/1991 | Selga . | |
| 5,100,051 | 3/1992 | Triglia et al. . | |
| 5,232,148 | 8/1993 | Vilas-Boas | 229/87.04 |
| 5,245,815 | 9/1993 | Savage . | |

*Primary Examiner*—Jes F. Pascua

[57] ABSTRACT

A reusable gift wrapping assembly for wrapping a gift item. It comprises a gift box and a two-parts gift wrapper. The first part is a reusable bag wrapper which is slidably engagable with the gift box for covering five sides of the gift box. The second wrapper is in the form of a card which is held in place by the box for covering the sixth side of the box. This two wrappers form a complete gift wrapping and give the appearance of a wrapping done conventionally with an integral piece of wrapping paper. The card wrapper can be printed with addressing information and greeting message thus making it a greeting card. A plurality of card wrapper/greeting cards printed with greeting messages for different occasions can also be provided. The user will have the freedom to choose from all available greeting cards the one with appropriate greeting message for the gift giving. All unused card wrapper/greeting cards will change hand during the gift giving so the receiver of the gift will also have all materials needed for gift packaging. One such reusable gift wrapping assembly can also be combined with a gift item into a single sellable unit to relieve the purchaser of the gift item the burden to come up with a gift wrapping. In one embodiment the card wrapper can also be made into a bookmark with a ribbon. Several reusable gift wrapping assemblies of different size can be packed into one package. A booklet containing an assortment of greeting messages for various occasions printed on stickers is also enclosed in the package. The user can remove one sticker of choice and glue it to the card wrapper/greeting card for the gift giving.

38 Claims, 3 Drawing Sheets

REUSABLE GIFT WRAPPING ASSEMBLY

This is a continuation of application Ser. No. 08/366,628, filed Jan. 3, 1995, now abandoned.

BACKGROUND OF THE INVENTION

This invention relates to gift wrapping, and more specifically, relates to reusable gift wrapping assemblies including gift boxes and gift wrappers.

Gift wrapping is generally done with a wrapping paper which is wrapped around a box containing a gift item. Gift wrapping can achieve either one or both of the following two goals: (1) to wrap and secure the box in its closed position for the protection of the gift item; (2) to provide a decorative covering of the box for enhancing the cheerful atmosphere during the gift giving.

Most conventional gift wraps are non-reusable. Once such gift wrap is opened the wrapping paper is usually torn and discarded. It is not only wasteful but also creating significant environmental problem in the disposal of the discarded wrapping paper.

Reusable gift wrapping generally refers to a pre-formed gift wrapper that can be secured around a box that contains a gift item. After gift giving, the receiver of the gift can remove the gift wrapper from the box without damage to the gift wrapper and reuse this gift wrapper again later for gift packaging.

A good reusable gift wrapper can or is expected to achieve the following goals: (1) eliminate/reduce the wasteful conventional practice of employing disposable gift wrapping; (2) wrap/unwrap easily and avoid the laborious conventional gift wrapping; (3) can be reused many times without damage to the wrapper or deterioration in the quality of the wrapping. (4) approach or exceed the conventional gift wrapping in its beauty and overall quality; and (5) the overall cost including labor is comparable with a conventional non-reusable pre-formed gift wrapper or disposable gift wrapping.

One known reusable gift wrapper is disclosed in U.S. Pat. No. 5,004,144, issued Apr. 2, 1991. It discloses a reusable gift wrapping which comprises a flexible expanse of folding fabric having releasable Velcro fasteners secured to its periphery. This reusable gift wrapper has achieved all first four of the above-listed five goals. But the relatively high cost in the material and its making may have impeded the wide acceptance of this otherwise ideal product.

A gift wrapping often is also accompanied by a greeting card. One common approach is to attach one such greeting card to the gift wrapper with the use of adhesive tape. However, in the case of reusable gift wrapping, the use of adhesive tape may often cause some damage to the reusable gift wrapper and defeat its purpose of reusability.

In most conventional manufacturing a gift item is always provided with a box. But this is still not a complete package since most often the purchaser still needs to spend considerable time and money to come up with a proper gift wrapping. It is therefore highly desirable if the manufacturer can provide a complete gift ensemble that also includes a gift wrapping to relieve the burden on the purchaser.

However, the concept of providing a complete gift ensemble is not practical for most conventional gift wrapping. Very often the purchaser needs to open the wrapping to examine the condition of the gift item either before purchase or anytime before gift giving. Unfortunately for most conventional gift wrapping it is difficult to break apart the wrapping without damaging the gift wrapper.

A box that comes with a gift item normally carries printed information about the gift item. This makes the box not reusable as a universal gift box. Many of such boxes are discarded which is again wasteful and creating significant environmental problem in the disposal of the discarded boxes.

SUMMARY OF THE INVENTION

It is, therefore, a primary object of the present invention to provide a reusable gift wrapping assembly that achieves all five above stated goals.

In the present reusable gift wrapping assembly a card wrapper is employed along with a reusable bag wrapper to achieve a complete wrapping which is easily unwrapped without damage to the reusable bag wrapper.

The card wrapper is made in the shape of a conventional greeting card and is printed with greeting message.

It is therefore another goal of the present invention to provide a greeting card as part of the present wrapping system for the benefit of the user.

It is also an object of the present invention to provide a plurality of greeting cards printed with different greeting message to allow the user full freedom to choose a proper card for the occasion. Each such greeting card is usable for the gift wrapping.

With additional spare greeting cards changing hand with each gift giving, the gift receiver will always have all needed materials for a new gift wrapping.

It is yet another object of the present invention to provide a complete gift ensemble which not only includes a gift item and a box for containing the gift item, but also includes a reusable gift wrapping set. This reusable gift wrapping set includes a reusable bag wrapper and a plurality of greeting cards. The purchaser of the gift ensemble will be relieved from the burden of finding a gift wrapping and a greeting card. The gift receiver will also have enough materials for a new gift wrapping.

In one embodiment a booklet of greeting messages for all occasions is also provided along with a reusable gift wrapping assembly having one or more greeting cards.

The greeting messages in the booklet can be either greeting phrases or greeting symbols printed on paper stickers. The user can peel the appropriate greeting sticker(s) off the booklet and attach it to the greeting card to be used in the gift packaging. This booklet will allow user even more choice of greeting messages for the gift giving. One such booklet can also be enclosed in a box of greeting cards sellable as a single unit.

Other objects and advantages of this invention reside in the construction of parts and the combination thereof, the mode of operation and use, as will become more apparent from the following description.

REFERENCE NUMERALS IN DRAWINGS

Figure 3:
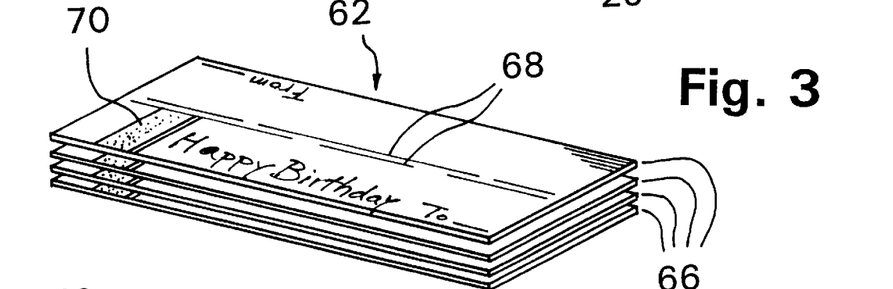
FIG. 3 is a perspective view showing a plurality of card wrappers.
Figure 4:
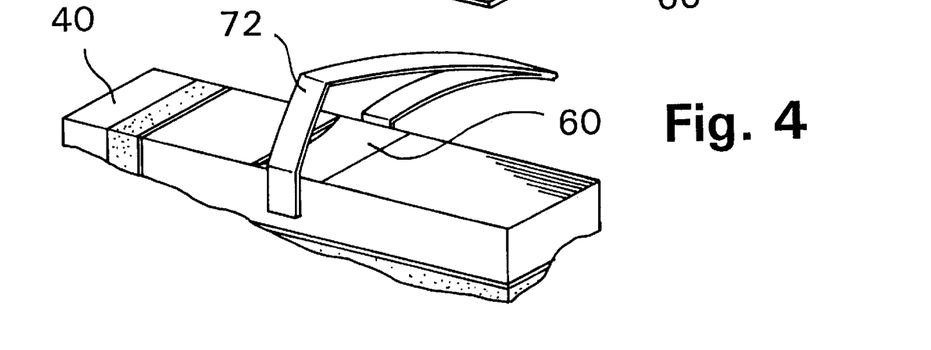
FIG. 4 is a perspective view showing a portion of a bag wrapper with a ribbon handle.
Figures 5, 6:
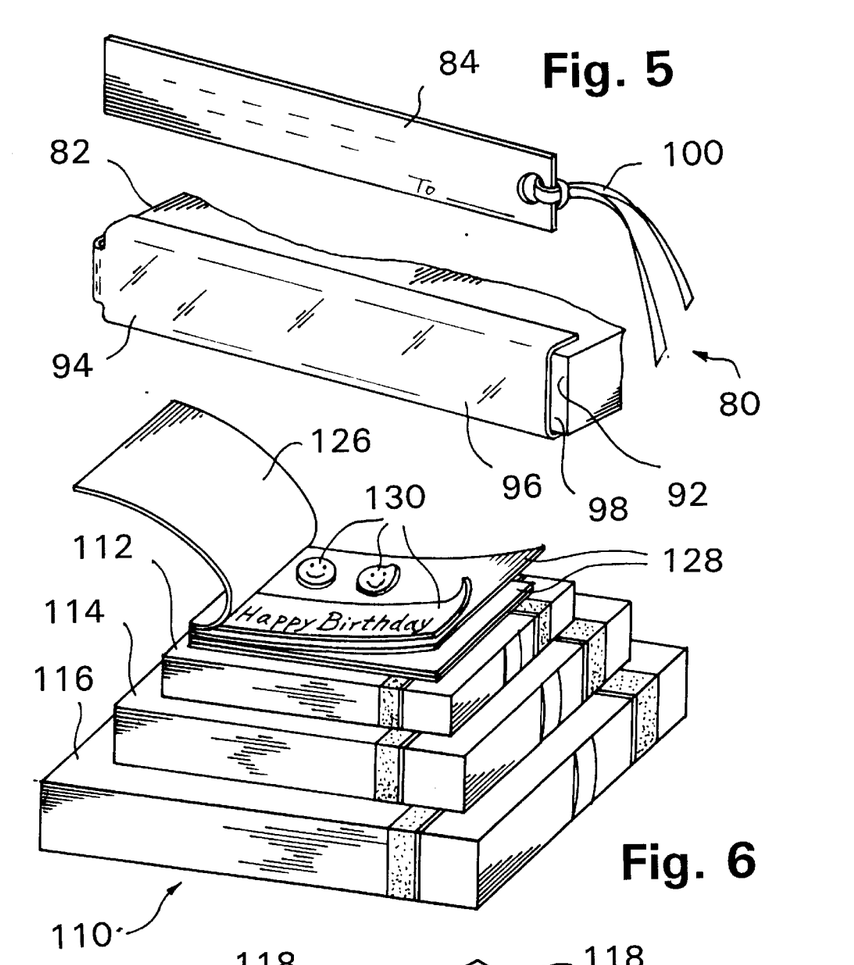
FIG. 5 is a perspective view showing a second embodiment of the reusable gift wrapping assembly of the present invention.
FIG. 6 is a perspective view showing one gift wrapping system of the present invention having three reusable gift wrapping assemblies of different size and a booklet of greeting messages.
Figure 7:
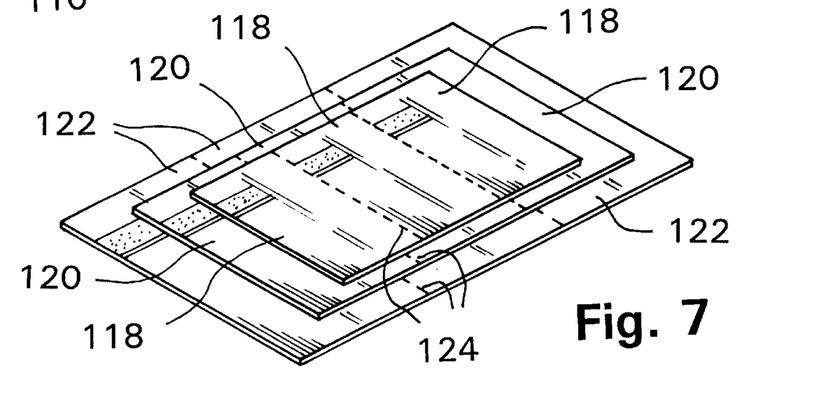
FIG. 7 is a perspective view showing a plurality of card wrappers containing no greeting word.

FIGS. 1–4
20 reusable gift wrapping assembly
22 box
23 gift item
24 box body
25 box lid
27 short side wall of the box body 24
28 short side wall of the box body 24
29 long side wall of the box body 24
30 long side wall of the box body 24
31 bottom panel of the box body 24
33 short side wall of the box lid 25
34 short side wall of the box lid 25
35 long side wall of the box lid 25
36 long side wall of the box lid 25
37 top panel of the box lid 25
40 reusable bag wrapper
41 open end of the bag wrapper 40
42 top wall
44 bottom wall
46 side wall
48 side wall
50 end wall
52 painted ribbon
54 painted ribbon
56 painted flower
58 slits
60 handle
62 card wrapper/greeting cards
64 card wrapper/greeting card
66 four card wrapper/greeting cards
68 crease on the card wrappers 52
70 painted ribbon
72 ribbon handle
FIG. 5
80 reusable gift wrapping assembly
82 gift box
84 card wrapper/bookmark
86 reusable bag wrapper
88 openable end
90 gift item
92 closed end
94 transparent sheet
96 side pocket
98 pocket opening
100 ribbon
FIGS. 6–7
110 multiple gift wrapping assembly system
112 reusable gift wrapping assembly
114 reusable gift wrapping assembly
116 reusable gift wrapping assembly
118 card wrapper/greeting cards
120 card wrapper/greeting cards
122 card wrapper/greeting cards
124 perforation line
126 booklet
128 sheets
130 stickers

DESCRIPTION OF THE PREFERRED EMBODIMENTS

FIGS. 1–4

Figure 1:
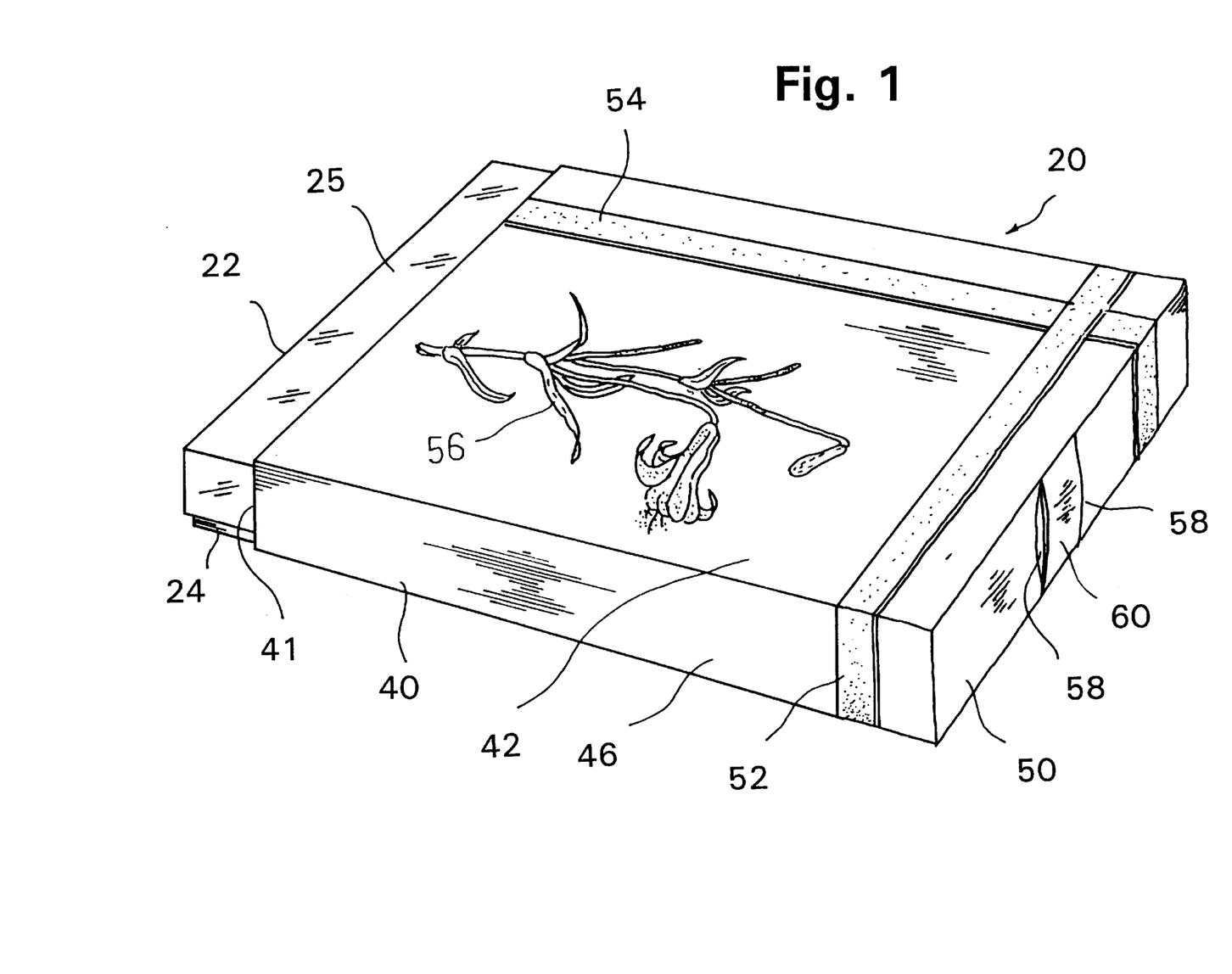
FIG. 1 is a perspective view showing one embodiment of a reusable gift wrapping assembly of the present invention.
Figure 2:
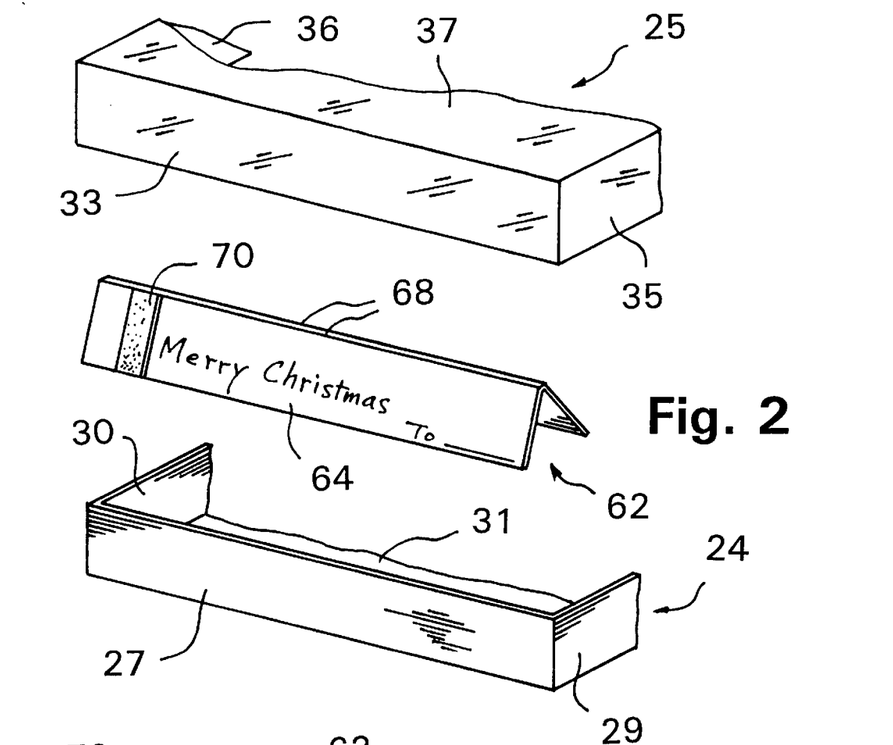
FIG. 2 is a perspective view showing a card wrapper and a gift box, with parts broken away, of the gift wrapping assembly of the present invention.

FIGS. 1 to 3 show a first embodiment of the reusable gift wrapping assembly 20 of the present invention. The first item included in this gift wrapping assembly 20 is a box 22 for containing and protecting a gift item 23 not shown. This box 22 is of conventional design. It consists of a box body 24 and a box lid 25.

The box body 24 is typically made of plain conventional cardboard. It has two short side walls 27, 28, two long side walls 29 and 30, and a bottom panel 31. The short side wall 28 is not shown in FIG. 2, but is of the same size and positioned in parallel with and opposite to the short side wall 27.

The box lid 25 is preferably made of transparent material such as plastic which allows the stored gift item 23 to be visible without opening the box 22. It has two short side walls 33 and 34, two long side walls 35 and 36, and a top panel 37. The short side wall 34 is not shown in FIG. 2, but is of the same size and positioned in parallel with and opposite to the short side wall 33.

Once closed, the box 22 will have six sides. These six sides are top side, bottom side, front end side, back end side, first long side and second long side. The top side and bottom side of the box 22 are represented by the top panel 37 and bottom panel 31, respectively. The front end side of the box 22 is represented by the short side wall 27 of the box body 24 and short side wall 33 of the box lid 25. The back end side of the box 22 is represented by the short side wall 28 of the box body 24 and the short side wall 34 of the box lid 25. The first long side of the box 22 is represented by the long side wall 29 of the box body 24 and the long side wall 35 of the box lid 25. The second long side wall of the box 22 is represented by the long side wall 30 of the box body 24 and the long side wall 36 of the box lid 25.

The second item of the gift wrapping assembly 20 is a reusable bag wrapper 40. This reusable bag wrapper 40 has the shape of a rectilinear bag with one open end 41. It has a top wall 42, a bottom wall 44, two side walls 46 and 48, and an end wall 50. The bottom wall 44 and side wall 48 are not shown in FIG. 1, but can be of same sizes and positioned in parallel with and opposite to the top wall 42 and side wall 46, respectively.

The reusable bag wrapper 40 can be made of conventional decoration paper or soft opaque plastic sheet. A painting of two decorative ribbons 52 and 54 are printed on the bag wrapper 40. Also shown on the bag wrapper 40 is the painting of a flower 56. Obviously, more decoration painting can also be provided if desired.

The reusable bag wrapper 40 is slidably engagable with the box 22. Its size is designed to fit the box 22 snugly when the box 22 is in the closed position. When the bag wrapper 40 is fully pulled over the box 22 until the end wall 50 is stopped by the back end side of the box 22 the bag wrapper 40 will completely cover five sides of the box 22. These five sides of the box 22 are the top side, bottom side, first long side, second long side and the back end side of the box 22. In the mean time the open end 41 of the bag wrapper 40 will just meet the edge of the uncovered front end side of the box 22.

As seen in FIG. 1 two parallel slits 58 are provided on the end wall 50 of the bag wrapper 40. A handle 60 is formed between these two slits 58. This handle 60 allows the bag wrapper 40 to be easily slid off the box 22 by simply inserting a finger through one slit 58 and pulling the handle 60. The two slit openings 58 will also allow the pressure inside the bag wrapper 40 to be quickly equilibrated when the bag wrapper 40 is moved with respect to the box 22.

The last item of the reusable gift wrapping assembly 20 to be described is a plurality of card wrappers 62 which include one card wrapper 64 shown in FIG. 2 and four card wrappers 66 shown in FIG. 3. Each card wrapper has two closely spaced creases 68 which allow the card wrappers 62 to be foldable as shown by the card wrapper 64 in FIG. 2.

The length of each card wrapper 62 is slightly shorter than the length of the short side wall 27 of the box body 24. When folded as shown in FIG. 2, the width of the card wrapper 62 on each side of the creases 68 is about the same or slightly narrower than the height of the short side wall 27 of the box body 24. This allows the folded card wrapper 62 to be straddled along the top edge of the short side wall 27. Once the box 22 is closed the front half of the card wrapper 62 is neatly sandwiched between the short side wall 27 of the box body 24 and the short side wall 33 of the box lid 25. In this way the plain cardboard surface of the short side wall 27 is totally covered by the card wrapper 62, while the decorative printing on the front half of the card wrapper 62 will be fully visible through the transparent short side wall 33 of the box lid 25. In this way the front end side of the box 22 is covered by the card wrapper 62.

At this point the back half of the folded card wrapper 62 is also visible through the transparent box lid 25. This, along with the gift item 23, will remain visible until the bag wrapper 40 is pulled over and covering the top panel 37 of the box lid 25.

As shown in FIG. 2, a decorative ribbon 70 is printed on the card wrapper 62. When the card wrapper 62 is in the seated position this ribbon 70 is aligned with the printed ribbon 54 on the bag wrapper 40. It thus creates an illusion that an endless ribbon is wrapped around the entire wrapping paper. The color, as well as any decoration pattern on the card wrapper 62 is also made the same as that of the bag wrapper 40. This, coupled with the fact that the parting line between the bag wrapper 40 and card wrapper 62 is nearly invisible, also creates an illusion that the box 22 is wrapped with an integral sheet of wrapping paper as commonly done in the conventional gift wrapping.

The bag wrapper 40 and the card wrapper 62, when used together as just described, form a complete wrapping of the gift box 22. The bag wrapper 40 serves to wrap and secure the box 22 in its closed position and provide a decorative covering. On the other hand, the card wrapper 62 just serves to provide a decorative covering of the box 22.

As seen in FIGS. 2 and 3, all card wrappers 62 are also printed with two types of information. The first one is a greeting message (i.e. "Merry Christmas"). The second one is the addressing information (i.e. "from/to"). These two type of information thus turn each card wrapper 62 into a greeting card. This unique card wrapper/greeting card is very desirable which eliminates the need for a separate greeting card.

As described above, the decoration pattern on the card wrapper 62 is preferably made the same as that of the bag wrapper 40 in order to create a illusion of integral gift wrapping. However, since the card wrapper 62 will also serve as a greeting card, it is also desirable that the card wrapper 62 can have a decoration pattern, except for the ribbon 70, totally different from that of the bag wrapper 40. In this case, while both the card wrapper 62 and the bag wrapper 40 serve the function of gift wrapping in decorative covering, an illusion is created which suggests that the card wrapper 62 is only a greeting card which is held in position by the ribbon 70 and which appears to completely block a portion of the "integral wrapping paper" covering the sixth side of the gift box 22. This illusion is formed since the parting line between the bag wrapper 40 and the card wrapper 62 is nearly invisible and without close up examination one can not tell whether there is any wrapping paper hiding behind the card wrapper 62 or not. This is a very desirable illusion which is made possible by the present unique bag wrapper-card wrapper design.

As seen in FIGS. 2 and 3 all card wrappers are of same size. But they are printed with different greeting message for different occasions such as anniversary, birthday, well wishing, etc. This will allow the user to choose the card wrapper/greeting card 62 suitable for the occasion.

All the remaining card wrappers 62 not used should also be placed in the gift box 22 to be sent along with the gift item 23. This will again allow the receiver of the gift item 23 a choice among all available card wrapper/greeting cards 62 when the present gift wrapping assembly 20 is reused.

Since the card wrapper/greeting card 62 is not reusable once addressing information is written on it, the present gift wrapping system can be reused many times until no more card wrapper/greeting card 62 is left. But a resourceful user can still extend the useful life of the present gift wrapping assembly 20 by custom designing one or more new card wrapper/greeting cards.

The operation of the present gift wrapping assembly 20 is very straight forward. A gift wrapping assembly 20 with size suitable for the gift item 23 is first chosen. The user will next select one card wrapper/greeting card 62 and fold it along the two crease lines 68. The addressing information is then written on the card wrapper/greeting card 62. Additional greeting message can also be written on the back half of the card wrapper/greeting card 62. Once completed the folded card 62 is straddled along one short side wall 27 of the box body 24. After this the gift item 23 and all unused card wrapper/greeting cards are placed in the box body 24. The box 22 can now be closed making sure that the front half of the card wrapper/greeting card 62 is properly sandwiched between the short side wall 27 of the box body 24 and the short side wall 33 of the box lid 25.

The bag wrapper 40 is next pulled over the box 22 until stopped by the back end side of the box 22. The assembly operation of the present gift wrapping assembly 20 is now complete and is ready for gift giving.

Before opening the gift wrapping assembly 20 the receiver will first see the front half of the card wrapper/ greeting card 62 with its greeting message and addressing information. To open the wrapping the receiver first inserts one finger through the handle 60 of the bag wrapper 40. The other hand loosely holds the front end side of the box 22 and tilts it downward. A slight shaking of the assembly 20 will cause the box 22 to slide off the bag wrapper 40 and fall into the palm of the receiver. The receiver can now proceed pulling the bag wrapper 40 away from the box 22.

The written greeting message on the back half of the card wrapper/greeting card 62 will be revealed the first moment when the box 22 is slid off the bag wrapper 40. As the bag wrapper 40 is further pulled away from the box 22 the gift item 23 will become visible which typically constitutes the climax moment of the gift giving/receiving.

It is clear that the present gift wrapping assembly can be easily assembled and disassembled without damage to the assembly. Except for the card wrapper/greeting card the entire assembly can be reused indefinitely. Its design is simple yet elegant. Its overall appearance is virtually the same as that of a conventional gift wrapper. The use of the card wrapper as a greeting card provides a great convenience to the user. Finally, since the entire assembly can be made of conventional gift wrapping materials, the production cost of such assembly should be comparable with that of a conventional pre-formed gift wrapper or disposable gift wrapping.

One other application of the present reusable gift wrapping assembly 20 is in the combination of it with a gift item into a gift ensemble as one single sellable unit as provided by manufacturers. The gift box 22 can be custom designed to fit the gift item to be sold. The purchaser of the gift item will be relieved from the burden to come up with a proper gift wrapping for the gift item. The purchaser is also free to choose one greeting card from all available card wrapper/greeting cards 62 that contains the most appropriate greeting message for the occasion.

Since the present gift wrapping assembly 20 employs a two-parts gift wrapper it can be disassembled easily without damaging the gift wrapper. The purchasers can readily open the wrapping to examine the product either before purchase or anytime before gift giving.

Both the gift box 22 and the bag wrapper 40 are reusable. Since all the spare card wrapper/greeting cards 62 also change hand during the gift giving, the gift receiver will also have enough materials for a new gift wrapping.

Since the gift box 22 is intended to be reusable, no advertisement message for the gift item will be printed on the box 22. Obviously, no printed information for the gift item is to be provided on the bag wrapper 40 either except for a bar code which is needed for checking out the gift item at the store. It is suggested that all advertisement of the gift item be printed on the large cardboard shipping containers that store multiple sets of gift ensemble.

It is also possible to provide a loose product sheet for each gift ensemble. In this case the loose product sheet should be placed outside of the gift ensemble in order to be visible to the potential purchasers. A transparent plastic sheet wrapping will be needed to hold the product sheet and the gift ensemble together as one sellable unit. The purchaser can remove this transparent plastic sheet wrapping and the product sheet before gift giving. The product sheet can also be replaced inside the gift box 22 if it is still of value to the gift receiver.

FIG. 4 discloses a modification of the reusable bag wrapper 40 of FIG. 1. In this modification a soft ribbon 72 with its two ends attached to the reusable bag wrapper 40 is employed. This soft ribbon 72 should have a length at least of 3" (7.6 cm) for the insertion of two fingers within the ribbon 72. Only one of these two fingers pulls the ribbon 72 to remove the bag wrapper 40 off the gift box 22. The other finger will press down the handle 60 to open wide the slits 58 for quick pressure equilibration when the bag wrapper 40 is pulled off the gift box 22. Such ribbon 72 is desirable especially for small bag wrapper whose handle 60 may not be large enough for the insertion of one finger. When not in use the soft ribbon 72 can be folded up and tucked beneath the gift box 22.

FIG. 5

FIG. 5 shows a second embodiment of the reusable gift wrapping assembly 80 of this invention. This reusable gift wrapping assembly 80 again consists of a gift box 82, a plurality of card wrappers 84 and a reusable bag wrapper 86. The reusable bag wrapper 86 is not shown which can be of the same shape and design as the bag wrapper 40 of FIG. 1.

The gift box 82 is of conventional design and is typically made of a one piece plain cardboard. It has one openable end 88, not shown, for loading and unloading a gift item, also not shown.

On the opposite side of this openable end is a closed end 92. As seen in FIG. 5, this closed end 92 is covered by a transparent sheet 94. This transparent sheet 94 is attached to the gift box 82 and formed into a side pocket 96. A pocket opening 98 is shown located on the right hand side of this side pocket 96.

All card wrappers 84 are of the same size. Each of the card wrappers 84 has a decorative pattern same as that of the reusable bag wrapper 86. In addition to the decorative pattern an addressing information (i.e. "to") can also be optionally printed on the card wrappers 84. In the present invention each of the card wrappers 84 will also serve as a bookmark. A bookmark message such as a proverb, maxim, etc. can be printed on one side of this bookmark 84. The other side of the bookmark 84 is left blank. A greeting message can be written here by the gift giver if desired. A colorful ribbon 100 is seen mounted on this bookmark 84 as commonly seen on most conventional bookmarks.

The operation of the present reusable gift wrapping assembly 80 is again very straight forward. First a card wrapper/bookmark 84 is chosen from all available ones. The user enters the addressing information and greeting message, if desired, on the chosen card wrapper/bookmark 84. This card wrapper is then inserted into the side pocket 96 through the pocket opening 98. The user puts all unused card wrappers 84 along with the gift item 90 into the gift box 84 and then closes off the openable end 88. The bag wrapper 86 is next pulled over the box 82 until stopped by the openable end 88. The assembly operation of the present gift wrapping assembly 80 is now complete and ready for gift giving.

Based on the same consideration as described above, the length of the bag wrapper 86 is chosen such that when the bag wrapper 86 is pulled over the box 82, the open end of the bag wrapper 86 will just meet the edge of the closed end 92 of the gift box 82. This bag wrapper 86 and the inserted card wrapper 84 will form a complete gift wrapping by covering all six sides of the gift box 82. The identical decoration pattern on the bag wrapper 86 and the card wrapper 84, coupled with the nearly invisible parting line between the bag wrapper 82 and the card wrapper 84, creates an illusion that the gift box 82 is wrapped with an integral sheet of wrapping paper as commonly done in the conventional gift wrapping.

It is clear from the above description that except for the card wrapper/bookmark 84 the entire gift wrapping assembly 80 is reusable. The card wrapper/bookmark 84 is not reusable once the addressing information is written on it. But it can be used as a bookmark by the gift receiver who will be constantly reminded of the receipt of the gift from the gift giver.

It is to be noted that once assembled the entire sheet of the card wrapper/bookmark 84 will be seated within the side pocket 96. But the ribbon 100 is still exposed outside of the side picket 96. This will allow the card wrapper/bookmark 84 to be easily removed from the side picket 96 by simply pulling the ribbon 100.

It is interesting to note that the concept of a transparent side pocket can also be applied for the insertion of a card wrapper/greeting card. For example, if a transparent side pocket with a pocket opening located along the top edge of the closed end 92 is provided, then it can be used to hold a card wrapper/greeting card such as the card wrapper/greeting cards 62 of FIGS. 1–2.

FIGS. 6–7

FIGS. 6 and 7 show a multiple gift wrapping assembly system 110 which comprises three reusable gift wrapping assemblies 112, 114 and 116. All these assemblies are of different size so that each assembly can be packed within an assembly of next larger size. In this way, several empty assemblies can be packed together with minimum space requirement.

Each of these three reusable gift wrapping assemblies 112, 114 and 116 has a gift box and reusable bag wrapper, which, except for the size difference, are essentially identical to the gift box 22 and reusable bag wrapper 40 of FIGS. 1–2, respectively.

FIG. 7 shows the card wrapper/greeting cards 118, 120 and 122 for the gift wrapping assemblies 112, 114 and 116, respectively. As seen in the figure, all three card wrapper/greeting cards 118 are printed on a single sheet. Two adjacent card wrapper/greeting cards 118 are separated by a perforation line 124 which allows each card wrapper/greeting card to be easily removable when needed. Such single sheet arrangement will reduce the cost in both printing and the handling of the card wrapper/greeting cards.

All card wrapper/greeting cards are printed with decoration pattern matching that of the bag wrapper of the gift wrapping assembly 112. But they can also have different decoration if desired. The card addressing information (i.e. "from/to")can be optionally printed on each greeting card 118. But no greeting word is printed on these greeting cards 118 for reason to be discussed below.

As seen in FIG. 6 the present multiple gift wrapping assembly system 110 also includes a booklet 126 containing many sheets 128 of greeting messages. All these greeting messages in either words or graphics for various occasions are printed on stickers 130. All these stickers 130 are glued to the booklet sheets 128 but can be easily removed from the sheets 128 when needed.

Since each card wrapper/greeting card 118 contains no greeting word the user will have the fill freedom to use any greeting card for any greeting occasion. Once a card wrapper/greeting card 118 is chosen, the user can next examine all available stickers 130 and removes the one containing the desired greeting message and glue it to the chosen greeting card 118. All stickers 130 are preferably made of transparent sheets so that they can blend in with the greeting cards 118 with little visible trace.

Except for the difference in size, the design of the card wrapper/greeting cards 120 and 122 are virtually the same as that of the card wrapper/greeting cards 118. Several sheets 128 of the booklet 126 will also have greeting message stickers 130 with size suitable for the card wrapper/greeting cards 120 and 122.

It is clear from the present disclosure that each greeting card of the present invention is usable for any occasion by merely removing the desired greeting message from the sheets and attaching it to the greeting card to be used. These sheets allow a broad range of greeting messages professionally designed to be available at the finger tips of the user. The greeting cards of the present invention are mainly designed for the reusable gift wrapping system, but this concept is also applicable for any greeting cards in general.

Although the preferred embodiments of the reusable gift wrapping systems of the present invention have been described, it will be understood that within the purview of this invention various changes can be made in the form, details, proportion and arrangement of parts, the combination thereof and the construction thereof, which generally stated, consist in a reusable gift wrapping system within the scope of the appended claims.

The invention having thus been described, the following is claimed:

1. A gift wrapping assembly comprising a box with a front end side, a back end side opposing and in parallel with said front end side, and four other sides for containing a gift item, the improvement wherein I. said gift wrapping assembly further comprises:
      (A) front end wrapping means removably engagable with said front end side of said box for wrapping said front end side of said box, and
      (B) a rectilinear bag having
         (a) four side walls slidably engagable with said four other sides of said box for wrapping said four other sides of said box, and
         (b) a bottom wall movable along with said four side walls for wrapping said back end side of said box, and
   II. said box includes:
      (i) a box body having at least one side wall and
      (ii) a box lid for covering said box body, and
   III. said front end wrapping means include a card foldable into two halves for straddling along said side wall and resting between said box body and said box lid.

2. The gift wrapping assembly of claim 1 in which said box lid is a transparent box lid.

3. The gift wrapping assembly of claim 1 in which said front end wrapping means include a plurality of cards with each of said cards foldable into two halves for straddling along said side wall and resting between said box body and said box lid.

4. The gift wrapping assembly of claim 1 in which said front end wrapping means include a plurality of different cards for different gift giving occasions, with each of said cards being foldable into two halves for straddling along said side wall and resting between said box body and said box lid.

5. The gift wrapping assembly of claim 1 in which said front end wrapping means include a plurality of cards printed with different greeting messages for different gift giving occasions, with each of said cards being foldable into two halves for straddling along said side wall and resting between said box body and said box lid.

6. The gift wrapping assembly of claim 1 in which said rectilinear bag is reusable.

7. A gift ensemble sellable as a single unit comprising a gift item and a gift wrapping assembly having a box with a front end side, a back end side opposing and in parallel with said front end side, and four other sides for containing said gift item, the improvement wherein I. said gift wrapping assembly further comprises:
      (A) front end wrapping means removably engagable with said front end side of said box for wrapping said front end side of said box, and
      (B) a rectilinear bag having
         (a) four side walls slidably engagable with said four other sides of said box for wrapping said four other sides of said box, and
         (b) a bottom wall movable along with said four side walls for wrapping said back end side of said box, and II. said box includes:
(i) a box body having at least one side wall and
(ii) a box lid for covering said box body, and
III. said front end wrapping means include a card foldable into two halves for straddling along said side wall and resting between said box body and said box lid.

8. The gift ensemble of claim 7 in which said box lid is a transparent box lid.

9. The gift ensemble of claim 7 in which said front end wrapping means include a plurality of cards with each of said cards foldable into two halves for straddling along said side wall and resting between said box body and said box lid.

10. The gift ensemble of claim 7 in which said front end wrapping means include a plurality of different cards for different gift giving occasions, with each of said cards being foldable into two halves for straddling along said side wall and resting between said box body and said box lid.

11. The gift ensemble of claim 7 in which said front end wrapping means include a plurality of cards printed with different greeting messages for different gift giving occasions, with each of said cards being foldable into two halves for straddling along said side wall and resting between said box body and said box lid.

12. The gift ensemble of claim 7 in which said rectilinear bag is reusable.

13. A gift wrapping assembly comprising a box with six sides for containing a gift item, the improvement wherein
(A) said gift wrapping assembly further comprises:
(a) first wrapping means including a rectilinear bag for removably covering five sides of said box, and
(b) second wrapping means including a card for removably covering the sixth side of said box, and
(B) said box comprises:
(a) a box body having at least one box body side wall, and
(b) a transparent box lid having at least one lid side wall slidably engagable with said box body side wall for holding said card between said box body side wall and said lid side wall.

14. The gift wrapping assembly of claim 13 in which said card is foldable into two halves for straddling along said box body side wall.

15. The gift wrapping assembly of claim 13 in which
(i) said second wrapping means include a plurality of cards for removably covering the sixth side of said box, and
(ii) said transparent box lid has one said lid side wall slidably engagable with said box body side wall for holding each of said cards between said box body side wall and said lid side wall.

16. The gift wrapping assembly of claim 13 in which
(i) said second wrapping means include a plurality of cards printed with different greeting messages for different gift giving occasions and for removably covering the sixth side of said box, and
(ii) said transparent box lid has one said lid side wall slidably engagable with said box body side wall for holding each of said cards between said box body side wall and said lid side wall.

17. The gift wrapping assembly of claim 13 in which said first wrapping means is reusable.

18. A reusable gift wrapping assembly comprising a box with a front end side, a back end side opposite to and in parallel with said front end side, and four other sides for containing a gift item, the improvement wherein said reusable gift wrapping assembly further comprises:

(A) a reusable preformed rectilinear bag wrapper having
(a) an open end allowing said box to enter said bag wrapper through said open end,
(b) four preformed side walls slidably engageable with said four other sides, of said box for wrapping said four other sides of said box, and
(c) a closed end, opposite to and in parallel with said open end, for wrapping said back end side of said box, and
(B) a plurality of cards with each of said cards being placeable over said front end side of said box for wrapping said front end side of said box and closing said wrapper open end for a first gift giving whereby rest of said cards are storable in said box and usable for subsequent gift giving.

19. The reusable gift wrapping assembly of claim 18 in which said cards are different from each other for different gift giving occasions.

20. The reusable gift wrapping assembly of claim 18 in which said cards are printed with different greeting messages for different gift giving occasions.

21. The reusable gift wrapping assembly of claim 18 in which said closed end of said bag wrapper has a slit forming a handle for pulling said bag wrapper away from said box and for equilibrating pressure across said slit.

22. The reusable gift wrapping assembly of claim 18 in which said cards are each foldable into two halves for wrapping said front end side of said box.

23. The reusable gift wrapping assembly of claim 18 in which
(a) said bag wrapper is printed with a first decorative article, and
(b) each of said cards is printed with a second decorative article which is in alignment with said first decorative article when said box is wrapped by both said bag wrapper and each of said cards.

24. The reusable gift wrapping assembly of claim 23 in which said decorative article is decorative ribbon.

25. The reusable gift wrapping assembly of claim 18 in which
said box includes:
(i) a box body having at least one side wall and
(ii) a box lid for covering said box body, and
(b) each of said cards is foldable into two halves for straddling along said side wall and resting between said box body and said box lid.

26. The reusable gift wrapping assembly of claim 25 in which said box lid is transparent.

27. The reusable gift wrapping assembly of claim 18 in which said box includes means for placing each of said cards over said front end side of said box.

28. The reusable gift wrapping assembly of claim 18 in which said box includes box lid means for placing each of said cards over said front end side of said box.

29. A gift ensemble sellable as a single unit comprising a gift item and a reusable gift wrapping assembly having a box with a front end side, a back end side opposing and in parallel with said front end side, and four other sides for containing said gift item, the improvement wherein
(A) a reusable preformed rectilinear bag wrapper having
(a) an open end allowing said box to enter said bag wrapper through said open end,
(b) four preformed side walls slidably engageable with said four other sides of said box for wrapping said four other sides of said box, and
(c) a closed end, opposite to and in parallel with said open end, for wrapping said back end side of said box, and (B) a plurality of cards with each of said cards being placeable over said front end side of said box for wrapping said front end side of said box and closing said wrapper open end for a first gift giving whereby rest of said cards are storable in said box and usable for subsequent gift giving.

30. The gift ensemble of claim 29 in which said cards are different from each other for different gift giving occasions.

31. The gift ensemble of claim 29 in which said cards are printed with different greeting messages for different gift giving occasions.

32. The gift ensemble of claim 29 in which said closed end of said bag wrapper has a slit forming a handle for pulling said bag wrapper away from said box and for equilibrating pressure across said slit.

33. The gift ensemble of claim 29 in which
  (a) said bag wrapper is printed with a first decorative article, and
  (b) each of said cards is printed with a second decorative article which is in alignment with said first decorative article when said box is wrapped by both said bag wrapper and each of said cards.

34. The gift ensemble of claim 33 in which said decorative article is decorative ribbon.

35. The gift ensemble of claim 29 in which
  (a) said box includes:
    (i) a box body having at least one side wall and
    (ii) a box lid for covering said box body, and
  (b) each of said cards is foldable into two halves for straddling along said side wall and resting between said box body and said box lid.

36. The gift ensemble of claim 35 in which said box lid is transparent.

37. The gift ensemble of claim 29 in which said box includes means for placing each of said cards over said front end side of said box.

38. The gift ensemble of claim 29 in which said box includes box lid means for placing each of said cards over said front end side of said box.

* * * * *